US006847992B1

(12) United States Patent
Haitsuka et al.

(10) Patent No.: US 6,847,992 B1
(45) Date of Patent: Jan. 25, 2005

(54) DATA PASS-THROUGH TO SPONSORS

(75) Inventors: Stacy Haitsuka, Los Angeles, CA (US); Ronald Burr, Agoura, CA (US); Harold MacKenzie, Los Angeles, CA (US); Marwan Zebian, Agoura, CA (US); Terry Warren, Santa Ana, CA (US); Shane Blaser, Camarillo, CA (US); Colin Giffen, Westlake Village, CA (US)

(73) Assignee: NetZero, Inc., Woodland Hills, CA (US)

( * ) Notice: Subject to any disclaimer, the term of this patent is extended or adjusted under 35 U.S.C. 154(b) by 695 days.

(21) Appl. No.: 09/628,465

(22) Filed: Jul. 31, 2000

Related U.S. Application Data

(60) Provisional application No. 60/160,422, filed on Oct. 19, 1999.

(51) Int. Cl.[7] .............................................. G06F 15/16
(52) U.S. Cl. ......................................... 709/218; 705/14
(58) Field of Search ................................ 709/219, 218; 705/10.14

(56) References Cited

U.S. PATENT DOCUMENTS

| 5,347,632 A | 9/1994 | Filepp |
| 5,584,025 A | 12/1996 | Keithley |
| 5,740,549 A | 4/1998 | Reilly |
| 5,761,662 A | 6/1998 | Dasan |
| 5,794,210 A | 8/1998 | Goldhaber |
| 5,848,396 A | * 12/1998 | Gerace .................. 705/10 |
| 5,913,040 A | 6/1999 | Rakavy |
| 5,948,061 A | * 9/1999 | Merriman et al. .......... 709/219 |
| 6,055,513 A | 4/2000 | Katz |
| 6,237,022 B1 | 5/2001 | Bruck |
| 6,327,574 B1 | 12/2001 | Kramen |
| 6,338,094 B1 | 1/2002 | Scott |
| 6,389,469 B1 | 5/2002 | Vekslar |

FOREIGN PATENT DOCUMENTS

| WO | WO97/27531 | 7/1997 |
| WO | WO97/32257 | 9/1997 |
| WO | WO97/32258 | 9/1997 |
| WO | WO97/43724 | 11/1997 |
| WO | WO97/46946 | 12/1997 |
| WO | WO98/13761 | 4/1998 |

* cited by examiner

Primary Examiner—John Leonard Young
(74) Attorney, Agent, or Firm—Steven C. Sereboff; Joel G. Landau; Socal IP Law Group

(57) ABSTRACT

In accordance with the present invention, there is provided a client application for enabling access to an online service and displaying advertisements while the user is accessing the online service. The client application receives play lists from the online service provider. The play lists include information about advertisements to be played and the order of play. The client application displays advertisements continuously within a dedicated client window while the user is connected to and/or using the online service. The client application preferably records informational data related to the user. When the user clicks-on an advertisement, the client application and an online server forward the user's informational data to the advertisement's sponsor. The sponsor uses the information to provide the user with customized information related to the advertisement.

17 Claims, 8 Drawing Sheets

DATA PASS-THROUGH TO SPONSORS

RELATED APPLICATION INFORMATION

This application is also related to the following applications, each of which is incorporated herein by reference:

(1) This application is related to Application Ser. No. 09/265,512 filed Mar. 9, 1999 entitled "Network Data Distribution Based Upon User-Specific Qualities," which is a continuation-in-part of Application No. 60/077,331 filed Mar. 9, 1998 entitled "Network Data Distribution Based Upon Geographic Location, Usage Patterns, Interactive Data, Profile Data, Demographic Data and Scheduling Information;"

(2) Application Ser. No. 09/324,747, entitled "Monitoring of Individual Internet Usage," filed Jun. 3, 1999;

(3) Application Ser. No. 09/349,325, entitled "System and Device for Monitoring Individual Internet Usage," filed Jul. 8, 1999;

(4) Application Ser. No. 09/364,544, entitled "Device For Displaying Advertisements to a User of an Online Service," filed Jul. 29, 1999;

(5) Application Ser. No. 09/348,411, entitled "Independent Internet Client Object with Ad Display Capabilities," filed Jul. 7, 1999;

(6) Application No. 60/160,422, entitled "Data Pass Through to Sponsors," filed Oct. 19, 1999, from which priority is claimed; and (7) Application Ser. No. 09/393,391, entitled "Internet Server with Dynamic Ad Targeting Capabilities," filed Sep. 10, 1999:

This application claims the benefit of U.S. Provisional Application No. 60/160,422, filed Oct. 19, 1999, entitled "Data Pass-Through to Sponsors," which is incorporated herein by reference.

NOTICE OF COPYRIGHTS AND TRADE DRESS

A portion of the disclosure of this patent document contains material, which is subject to copyright protection. This patent document may show and/or describe matter, which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates to passing information in conjunction with resource requests in a data network.

2. Description of Related Art

Online services today offer a variety of services to their users. Users may access news, weather, financial, sports, and entertainment services, participate in and retrieve information from online discussion groups, and send and receive email. A user of an online service typically accesses the service using specialized communication software (i.e., client application or client software) that establishes and manages a connection from the user's computer (or client) to the online service provider's host computers (or servers) and facilitates the user's interactions with the service.

In addition to managing the connection, there is provided software to display pages or screens relating to retrieved content according to views or presentations specific to the online service. This software may be integrated with the client application. The functionality of the content and the user interface (i.e., icons, dialog boxes, menus, etc.) for interacting with the content are typically dictated by various standards.

Interactions between the user's computer and the online service are facilitated by a variety of software protocols (i.e., communication conventions, rules and structures), including application level protocols, for managing the transfer of data across the network and to the client application on the user's computer. A protocol may be proprietary or exclusive to an online service such that only client software from the online service provider may be used to communicate with the server software. For example, an online service provider that supports electronic mail, discussion groups, chat groups, news services, etc. may define and use specific protocols for each type of service so that appropriate information is exchanged between the participants (i.e., clients and servers). Each application-specific protocol may be based on a common, underlying protocol.

The Internet and World Wide Web ("Web"), comprised of a vast array of international computer networks, many provide online service users with considerable information resources and other content. Typically, this content is accessed using a web browser, such as Microsoft Internet Explorer or Netscape Navigator, capable of understanding the HyperText Markup Language (HTML) used to create the documents found on the Web and the HyperText Transfer Protocol (HTTP) used to navigate the Web. Email and Usenet discussion groups are typically accessed through companion software to the browser. Although web browsers typically have varying levels of functionality or sophistication, retrieved content is displayed in content pages according to views or presentations specific to the web document currently presented by the web browser. Typically, the views and presentations are different than those provided by the communication software from the online service provider because the web browser is, in fact, a separate client application displaying web documents containing presentation directives.

When using a browser, the browser issues HTTP messages to request web pages. A requested web page is typically identified using its URL—uniform resource locator. The URL is a reference (or address) to a resource available on a TCP/IP network such as the Internet. A URL is composed of a character string, and may have a number of parts. These parts include a top level domain name, second level domain name, directory name, and file name. URLs may identify a file located on a web server. URLs may also point to other resources on the network such as database queries and command output. The determination and use of URLs is well known in the art and is not discussed further herein. There are two typical techniques of providing content from a web server which is customized to a user.

In one technique, the user enters information into a form on a web page, clicks on a button on the web page, and the entered information is sent to the web server as part of an HTTP message. This technique requires the user to manually identify himself or manually provide custom information. Thus, the user must enter his information each time he would like a customized web page.

A second technique utilizes cookies. A cookie is information that a web server puts on a user's hard disk so that the web server can remember something about the user at a later time. More technically, it is information for future use that is stored by the server on the client side of a client/server communication. Typically, a cookie records a user's preferences when using a particular web site. Using the HTTP, each request for a web page is independent of all other requests. For this reason, web servers have no memory of what pages they have sent to a user previously or anything about a user's previous visits. A cookie is a mechanism that allows the server to store its own information about a user on the user's own computer. Cookies are commonly used to rotate the banner ads that a site sends so that it does duplicate ad transmissions on a succession of requested pages. Cookies can also be used by a web server to customize pages for a user based on the user's browser type or other information the user might have provided the web server. Cookies are computer-specific, not user-specific. Each computer has a different set of cookies, and web servers generally cannot recognize that the same user has used two different computers. Furthermore, unless a user has provided user-specific information to a web server, the web server's cookie will not have any user-specific information.

In some portions of this disclosure, the term "resource locator" is used. The term is defined as a string or code which uniquely identifies a resource on a network. Thus, the URL is a species of resource locator.

There are a number of types of online service providers that administer the provision of online services to users. Online services may serve the general public or may serve a limited class of individuals. Some public OSPs utilize proprietary networks; America Online and @Home are examples. Other public OSPs use the public networks, and most Internet Service Providers (ISPs) are an example. OSPs often provide Internet access. Internet access is the primary service provided by some OSPs, most notably ISPs.

Users typically connect to an OSP using a computer with a communications device such as an analog modem, an Ethernet adapter, DSL adapter or cable modem. Such connections may be analog or digital, dial-up or constantly-connected. Subscribers typically pay a fee for their subscriptions to OSPs. These fees typically are in the form of a sign-up fee, plus online charges which are fixed (i.e., unlimited monthly access for a fixed fee) or based upon the amount of time the user is connected to the online service. The fees generally increase with bandwidth.

Some online service providers have derived revenue by displaying advertisements for third parties (hereinafter, "advertisements") to users. For example, when a user accesses a web page on the Web, an advertisement may be displayed to the user as part of the web page. Advertisements are also shown to users of some proprietary online services. Typically in such systems, each user accessing a certain screen or site is shown the same advertisement. Sophisticated systems have the capability to chan ge the advertisement after a certain period of time.

Some attempts have been made to provide advertising-supported online services, including Internet access, on a free or heavily discounted basis. Typically, these online services required the user to use a special client application for connecting to the online service. The client application typically causes an advertising window to be displayed on the user's display. This advertising window remains visible and on top of other windows throughout the entire online session. The client application receives advertisements from the online service provider, and the client application displays the advertisements in the advertising window. It is unknown to the inventors, however, whether the transmission of advertisements from the online service provider to the client application is initiated by the online service provider or the client application, how the online service determines which advertisements to send to the users, and whether such typical client applications do anything more than open the communications link with the online service and display advertisements.

In one advertising based Internet service called Bigger.net, the client application periodically requested new advertisements from an ad server. A host computer monitored the time between such requests and terminated the connection if a preset period of time was exceeded. Bigger.net also had the ability to monitor network activity, though it is unclear how this was done.

Other advertising-supported online services have included: CyberFreeway, which used a client application developed by HyperNet, Inc. of Tokyo, Japan; Juno Online, which provided free email; Tritium and Freewwweb.

Advertisers find it desirable to target advertisements to relevant potential customers. For example, an advertiser of stockings would prefer to target women rather than men with its advertising. A Boston restaurant would prefer to target residents of Boston and business travelers rather than children living in San Francisco. Moreover, advertisers prefer to pay for advertising based upon the number of relevant consumers who are actually exposed to the advertisement. For typical online systems and networks, including the Web, it is often difficult for an advertiser to precisely determine whether its advertisements were actually viewed by a user and for how long, and whether the advertisement induced a response. Accordingly, there exists a need for a targeted advertisement system that also can provide information as to the characteristics of those who were exposed to each advertisement, for how long the user was exposed, and at what times.

It is believed that the prior art advertising-supported online services did not have the ability to target advertisements. Furthermore, their client applications are believed to have been limited in capabilities.

SUMMARY OF THE INVENTION

In accordance with one aspect of the present invention, there is provided a client application for enabling access to an online service and displaying advertisements while the user has access to the online service. The client application receives play lists from the online service provider. The play lists include information about advertisements to be played and the order of play. The client application displays advertisements in a client window continuously while the user has access to the online service. When a user clicks on an advertisement, the client application causes a resource associated with the advertisement to be loaded by a browser application.

In another aspect of the invention, an online server obtains descriptive information related to the user, such as the user's age, gender, address, interests, marriage status, income, and occupation. The client application monitors the user's click-throughs of advertisements. Whenever a user clicks-through on an advertisement, the client application initiates a process whereby the user-related information is passed to the advertisement's sponsor. The sponsor then utilizes the user-related information to select an electronic presentation for the user that is related to the advertisement. In one embodiment, the process occurs in real time. The online server processes the user information and identifies one or more resources that are accessed to provide the user with an electronic presentation related to the advertisement. In another embodiment, the user-related information is stored in a data store for the sponsor. The sponsor can then analyze the data over time and modify or enhance one or more electronic presentations associated with the advertisement.

Still further objects and advantages attaching to the system and to its use and operation will be apparent to those skilled in the art from the following particular description.

DESCRIPTION OF THE DRAWINGS

Further objects of this invention, together with additional features contributing thereto and advantages accruing therefrom, will be apparent from the following description of a preferred embodiment of the present invention which is shown in the accompanying drawings with like reference numerals indicating corresponding parts throughout and which is to be read in conjunction with the following drawings, wherein.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.
The System of the Invention The system of the invention enables data, such as advertisements, to be sent to users based upon: the user's geographic location; the user's interactive data; the user's network usage data; the user's personal profile information; the scheduling requirements of the data to be sent; and the demographic requirements of the data to be sent.

Figure 1:
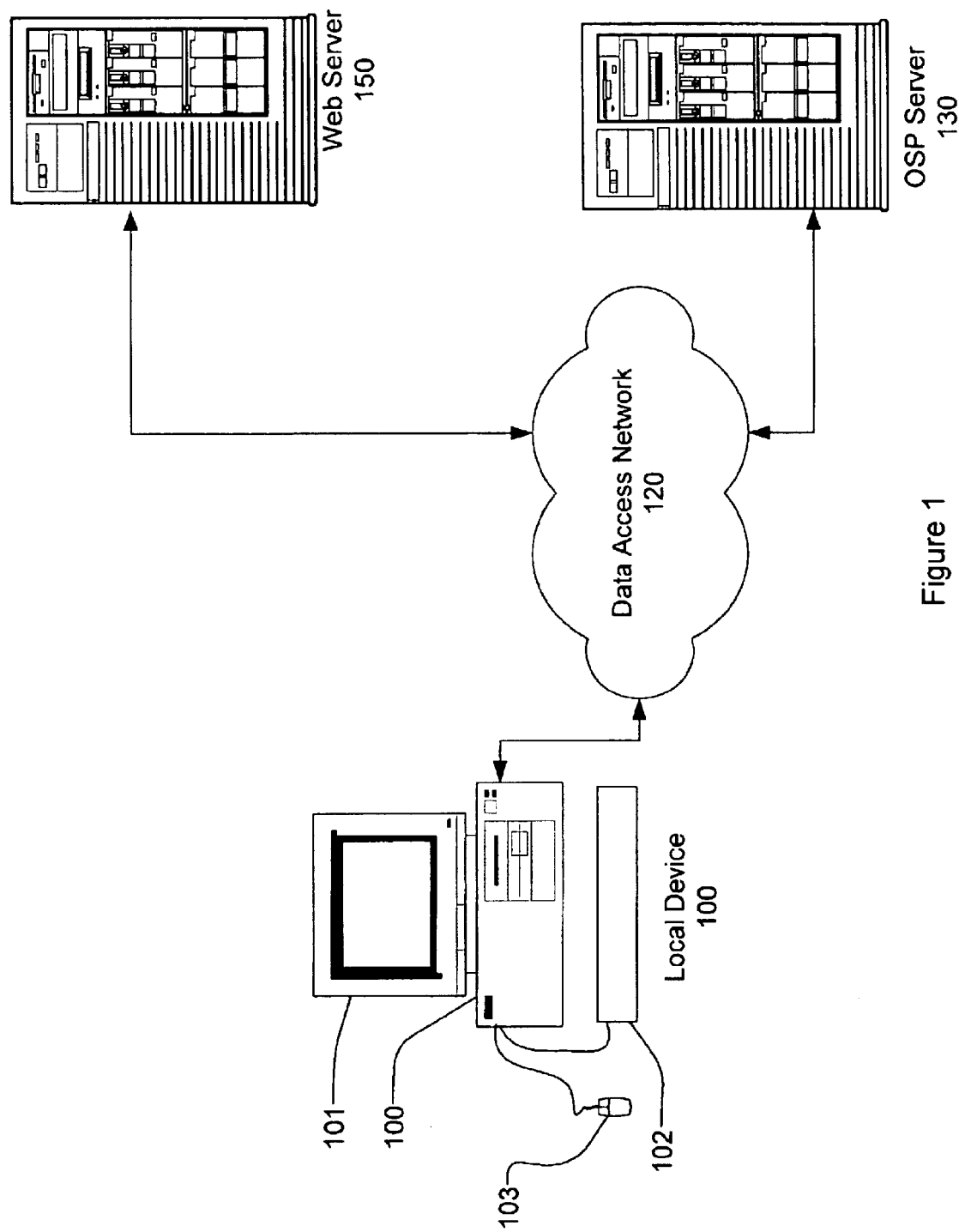
FIG. 1 is a first block diagram of a network data distribution system in accordance with the invention.

Referring now to FIG. 1, there is shown a block diagram of a network data distribution system in accordance with the invention in conjunction with a source of web pages. FIG. 1 includes a local device 100, a data access network 120, an OSP server 130 and a web server 150. The local device 100, the data access network 120 and the OSP server 130 comprise the network data distribution system. The local device 100 is provided online service to the network data distribution system under control of the OSP server 130. An online service provider controls the OSP server 130.

The local device 100 preferably comprises a client computer which is configured to access the OSP server 130 via the local access network 120. The client computer may be, for example, a PC running a Microsoft Windows operating system. The local device 100 preferably includes an output device, such as display 101, and an input device, such as keyboard 102 and/or pointing device 103 (e.g., mouse, track ball, light pen, or data glove). The local device 100 may also be, for example, an Internet appliance, network computer (NC), or an appropriately Internet-enabled device such as a portable digital assistant (PDA), mobile phone, refrigerator, etc. The particular type of device of the local device 100 is not considered to be important so long as the local device 100 can provide some measure of individual user interactivity with an online service.

The data access network 120 provides lower layer network support for the local device 100 to interact with online service, including the OSP server 130 and the web server 150. The data access network 120 preferably comprises a common or private bi-directional telecommunications network (e.g., a public switched telephone network (PSTN), a cable-based telecommunication network, a LAN, a WAN, a wireless network), coupled with or overlaid by a TCP/IP network (e.g., the Internet or an intranet).

The web server 150 may be of the type known in the art and has the ability to serve web pages to the local device 100, as requested in the manner known in the art. It should be appreciated that the web server 150 is representative of any source of web pages available to the local device 100. Thus, for example, the web server 150 could be accessible from the Internet, or it could be a part of an intranet and represents any number of web servers.

The OSP server 130 preferably is a computer system, such as a server computer. Alternatively, the OSP server 130 may be considered to represent a number of physical devices which as a group provide the indicated network services. The OSP server 130 acts as a recipient of certain information transmitted by the local device 100, as described further below. The OSP server 130 preferably also transmits certain data to the local device 100 as described further below.

Figure 2:
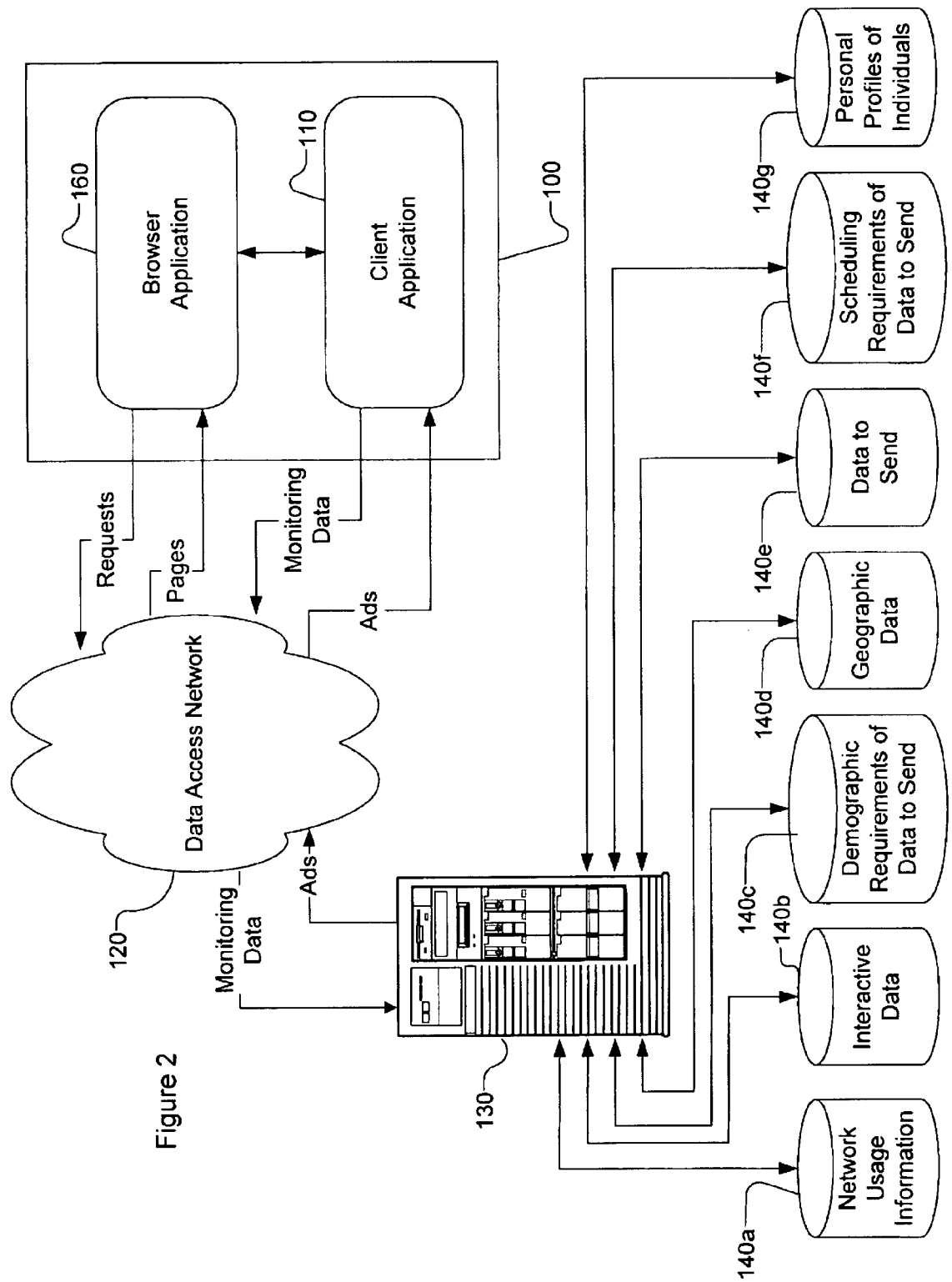
FIG. 2 is a second block diagram of a network data distribution system in accordance with the present invention.

Referring now to FIG. 2, there is shown a block diagram of a network data distribution system of an online service in accordance with the present invention. The system comprises a client application 110, the data access network 120, the OSP server 130 and one or more data stores 140, which are referred to collectively using the reference numeral 140 and individually using the suffix a, b, c, d, e, f, or, g.

A browser application 160 is also shown. A "browser application" is software which provides interactive utilization of hypertext objects located on a network, such as web pages on the Internet. As used herein, "browser application" also includes most email clients and ftp clients. The client application 110 is a program operative on local device 100, and preferably an independent application program or a DLL. The client application 110 preferably retrieves certain network data, displays certain network data, transmits geographic location data, transmits interactive user data, transmits network usage data and transmits personal profile information as described below. The client application 110 preferably also sets up and provides access to the online service. The data stores 140 store and provide this geographic information data 140*d*, network usage data 140*a*, interactive usage data 140*b*, personal profile information 140*g*, data to be sent 140*e*, schedule for transmitting data 140*f* and demographics for transmitting data 140*c*. Additional data stores 140 may be provided to store any of a wide variety of information related to the online service.

The browser application 160, such as Microsoft Internet Explorer or Netscape Navigator is preferably installed on the local device 100. When the local device 100 is connected to the web server 150 through the data access network 120, the user of the local device browses the web server 150 from the local device 100 using the browser application. The browser application itself need not be stored on the local device 100. The important aspect is that the user, from the local device 100, can exercise control over what web pages are requested and thus displayed by the local device 100.

Each time a user uses the local device 100 to connect to the online service, the client application 110 and the OSP server 130 establish a session. In this session, the client application 110 transmits certain information regarding the user of the local device 100 and his use of the local device 100 while connected to the online service. The OSP server 130, on the other hand, uses the information from the client application 100 to determine information which should be sent to the client application 110. Preferably, the information from the client application 110 is used by the OSP server 130 to select advertisements which the local device 100 should display. The client application 110 then causes these advertisements to be displayed on the local device's display 101.

The information from the client application 110 regarding the user preferably includes geographic data and personal profile information. Geographic data indicating the user's current location preferably is sent from the client application 110 to the OSP server 130, which then stores the geographic data in the data store 140*d*. This geographic data can be something simple, like a phone number. The user preferably provides personal profile information on a periodic basis which is stored in the data store 140*g* and used by the OSP server 130. Personal profile information is defined as any information that describes the user. This information includes (but is not limited to) geographic location information, psychological information, hobbies, interests, education level, income level, gender, age, marriage status, home address and personal interests.

The information regarding the user's use of the local device 100 includes email usage, web usage and advertisement click-throughs. The user's interactions and feedback with the web server 150 provided through the browser application 160 are preferably captured by the client application 110, analyzed by the OSP server 130 and stored in the data store 140*b*. This includes the user's feedback and responses to the data delivered to the browser application 160. The user's activities on the web server 150 provided through the browser application 160 are preferably captured by the client application 110, analyzed by the OSP server 130 and stored in the data store 140*a*. This includes the type of network data the user requests and accesses. This data is preferably summarized and classified into multiple demographic profiles.

The data to be sent to users preferably has scheduling requirements that dictate when it should be sent. These scheduling requirements include (but are not limited to): frequency, maximum number of times to send to an individual, minimum number of times to send to an individual, time of day to send, and first and last days to send. The data to be sent to users can have demographic requirements that dictate to whom it should be sent. These include (but are not limited to): personal profile, interactive data, network usage information and geographic location.

Figure 3:
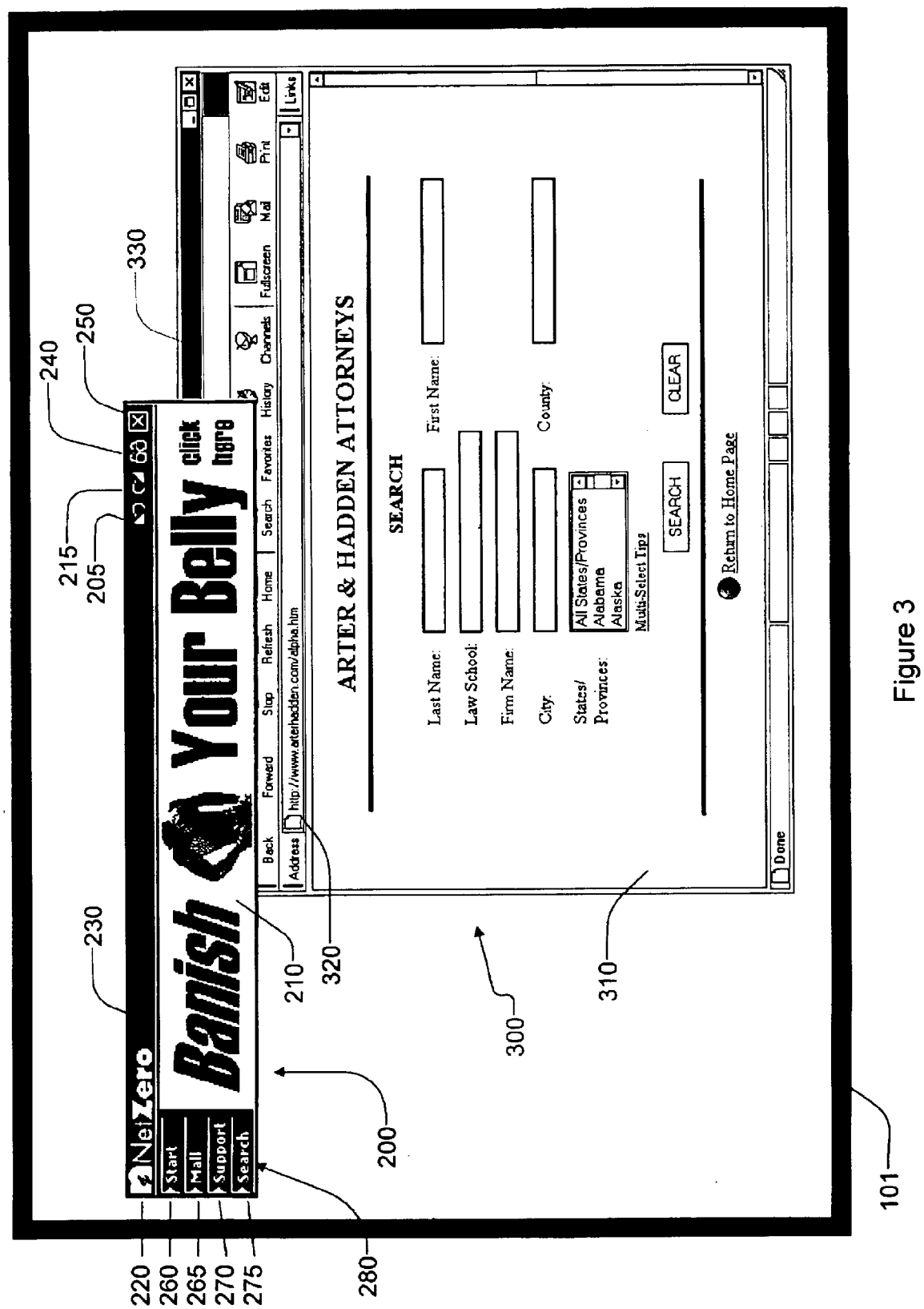
FIG. 3 is a representation of a display of a local device having a client window and a browser window.

Referring now to FIG. 3, there is shown the display 101 having a client window 200 and a browser window 300. The client window 200 is generated and controlled by the client application 110. The browser window is generated and controlled by the browser application 160, here Microsoft Internet Explorer. The browser window 300 is familiar to those skilled in the art, so the particulars are not described further herein. Further information regarding the use of most browser applications and their technical specifications is abundantly available.

The client window 200 includes a title bar 230, an advertising pane 210, a number of operational icons 205, 215, 220, 240, 250 on the title bar 230, and a number of button bar icons 260, 265, 270, 275 on a button bar 280. The title bar 230 preferably identifies the name of the OSP. The advertising pane 210 is a space in which the client application 110 may cause advertisements to be displayed. The client application may also be able to cause advertisements to be displayed in other windows, such as browser window 310.

The button bar icons 260, 265, 270, 275 preferably provide one-click access to Web pages and/or menus that might be useful to the user. The online service provider can sell the button bar icons to third parties as an additional revenue source. These icons 260, 265, 270, 275 are associated with particular URLs. The icon 260 is associated with a start page. The icon 265 is associated with an online shopping mall page. The icon 270 is associated with an online technical support page from the online service provider. The icon 275 is associated with an online search engine page. By clicking on any of these icons 260, 265, 270, 275, the client application 110 causes the browser application 160 to load the Web page having the URL associated with the selected icon.

The operational icons 205, 215, 240, 250, 280 on the title bar 230 preferably provide one-click access to operational features of the client application 110. As explained below, the client application 110 maintains records of the advertisements which have been displayed. The cycle back icon 205 allows the user to review advertisements which were previously displayed by the client application 110, in the reverse order in which the advertisements were displayed. If the user has cycled back through advertisements, the cycle forward icon 215 allows the user to review advertisements in the order in which the advertisements were displayed by the client application 110. The search icon 240 provides convenient access to online searching facilities. The close icon 250 causes the client window 200 to close, and thus also causes the session with the online service to terminate.

The menu icon 280 provides access to a menu of additional menu items and functions. The menu preferably provides alternative and enhanced access to the features associated with the button bar icons 260, 265, 270, 275 and the other operational icons 205, 215, 240, 250. In addition, the menu preferably provides the user with the ability to hide or show the title bar 230 and/or the button bar 280. The menu preferably also allows the user to access and edit his profile. The menu preferably provides the user with the option of positioning the client window 200 at any of a number of predefined positions, such as top left corner of the display 101, top right corner, bottom left corner, or bottom right corner.

The browser window 300 includes a display pane 310, an address bar 320 and a title bar 330. The display pane 310 is a region of the browser window 300 wherein the browser application causes web pages received by the browser application to be displayed. The address bar 320 is another region of the browser window 300 and the browser application displays URLs in the address bar 320 corresponding to the web page currently displayed in the display pane 310. The user can also enter a URL into the address bar 320, and the browser application will attempt to load the web page or other object to which the entered URL points. The primary feature of the title bar 330 is that it displays the title of the browser application. Another feature of most browsers is that the title bar 330 displays the title of the web page then displayed in the display pane 310.

The client window 200 is displayed on top of the browser window 300. In some embodiments, the client window 200 remains visible and on top of all other windows so long as the communication channel to the OSP server 130 is open. The client application 110 can control the location of the client window 200 on the display 101. For example, the client application 110 may allow the user to select one of several predefined locations for the client window 200, such as lower left corner, upper right corner, etc. Some operating systems such as Microsoft Windows permit windows to be moved to the edge of the display 101 so that only a small portion of the window is visible. The client application 110 may be empowered to prevent the client window 200 from being moved off of the visible area of the display 101. When the user attempts to hide all or a part of the client window 200, the client window preferably moves the client window 200 to a fully visible area of the display 101.

The Methods of the Invention

Figure 4:
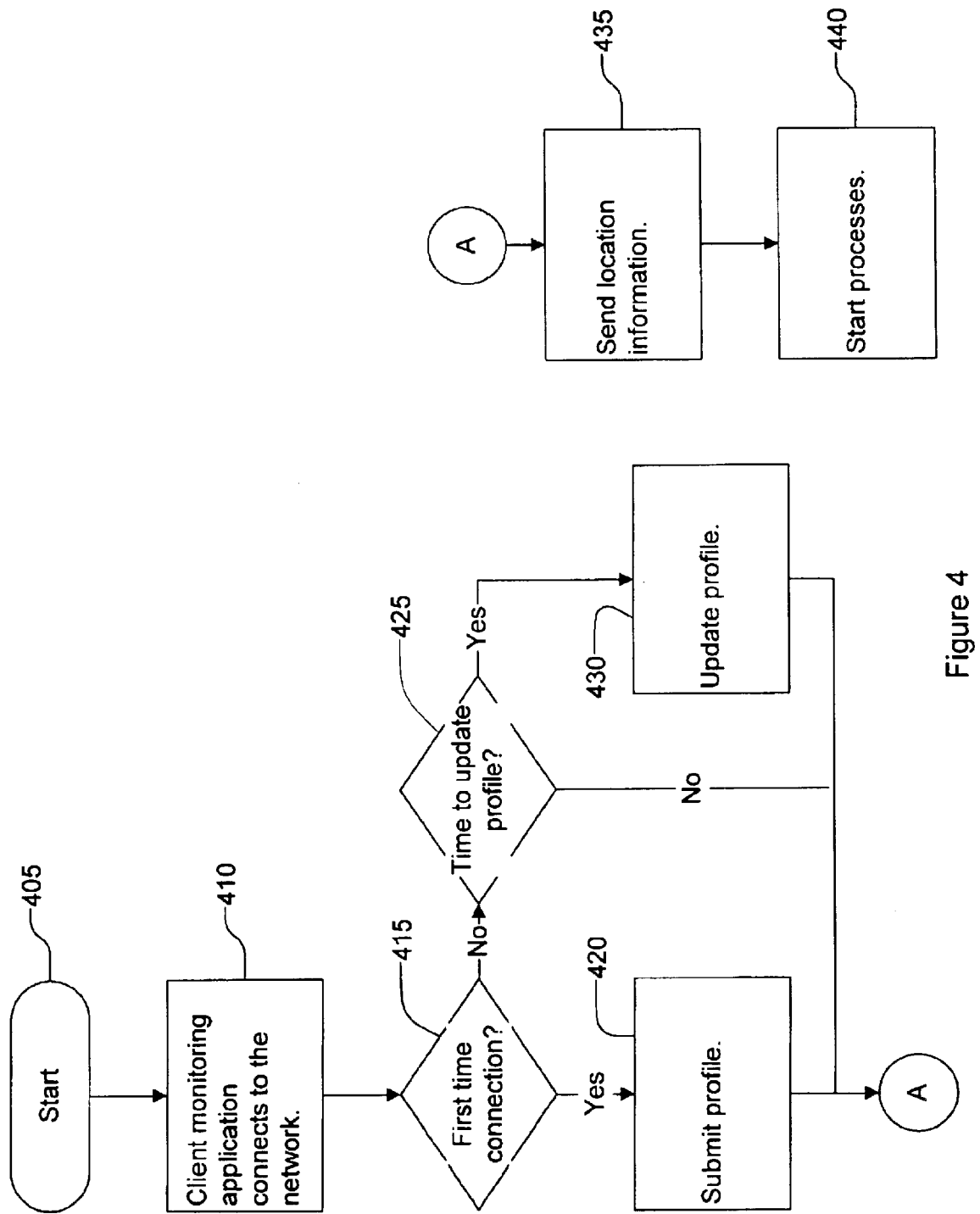
FIG. 4 is a flow chart of a method of monitoring web browsing by a user in accordance with the invention.

Referring now to FIG. 4, there is shown a flow chart of a method of distributing data in a network in accordance with the invention. The components 110, 120, 130, 140 work together to deliver data that meets the geographic and demographic criteria.

After the method begins (step 405), the user preferably uses the client application 110 to connect to the data access network 120, and then the OSP server 130 (step 410). The particular manner of the connection depends on the network infrastructure underlying the connections. The important aspect of this step 410 is that a communications channel is established between the client application 110 and the OSP server 130. By "communications channel," it is meant a logical path for data transmission. A logical data path or logical data link is defined as a communication path between two terminals across which data may be transmitted. The OSP server 130 preferably acts as a gatekeeper to the online services. Only after the OSP server 130 has authorized access can the local device 100 access the web server 150 and the other resources of the online service.

The communication channel may be of two varieties—dial-up or constant-connection. In a dial-up communication channel, the connection to the online service becomes available only after the local device 100 creates a physical link to the online network via a PSTN and then a logical link to the online network. For example, the local device 100 has a dial-up communication channel if the local device 100 has a modem and connects through tone dialing to the online service using the PSTN. In a constant-connection communication channel, the connection to the online service is always available to the local device 100, and the local device need only access a logical link to the online network. For example, the local device 100 has a constant-connection communication channel when the local device 100 has a cable modem and connects to the online service using a cable service. Digital subscriber lines (DSL), integrated services digital networks (ISDN), and fixed wireless connections are other examples of constant-connection communication channels.

If this is the first time the user has connected (step 415), then the OSP server 130 preferably requires the user to use the local device 100 to submit personal profile information (step 420). Preferably, the OSP server 130 periodically will request (step 425) that the client application 110 have the user update this profile (step 430).

The personal profile information is preferably maintained by the OSP server 130 within a user information record, referred to as a User Record, comprising a file that is stored in one of the data stores 140. The User Record preferably contains a plurality of data fields that each correspond to some informational aspect or demographic category associated with the user. A demographic category means any type of informational category this is used to define the user. In one embodiment, the User Record includes data fields that are associated with at least each of the following demographic categories for the user: name, age, gender, street address, state, country, zip code, income, occupation, education level, marital status, hobbies, and family size. The demographic categories may also relate to other user interests, such as sports interests and musical interests.

Each time the local device 100 connects to the OSP server 130, the OSP server 130 preferably obtains data indicating the local device's current geographic location (step 435). In the case of a dial-up connection, this geographic information is preferably derived from a local access phone number used by the client application 110 to connect to the data access network 120, and the client application 110 transmits its local access phone number to the OSP server 130 for geographic determination purposes.

Once connected, a number of processes are preferably started (step 440). In one of these processes, whenever the user interacts with data received on the client application 110, the client application 110 sends feedback information respecting this interaction to the OSP server 130. The OSP server 130 then summarizes and classifies the feedback information into demographic profiles stored in the data store 140.

In another of these processes, whenever a user uses the browser application 160 to request or access data from the web server 150, the client application 110 sends feedback information respecting these requests and data accesses to the OSP server 130. The OSP server 130 then summarizes and classifies this feedback information into the demographic profiles in the data store 140.

In another of these processes, while a user's local device 100 is connected to the web server 150, the OSP server 130 determines which targeted data needs to be sent to the client application 110 and then transmits this targeted data to the client application 1110. The OSP server 130 accomplishes this by:

examining the scheduling requirements to determine which data needs to be sent;
  examining the demographic requirements of the data to determine to which demographic profiles the data needs to be sent;
  selecting the users who are currently connected that meet the demographic requirements of the data; and
  sending the data to the selected users.

As mentioned, one of the processes relates to the display of data, and particularly advertisements, in the client window 200. Methods of displaying advertisements to a user of an online services are described next.

Figure 5:
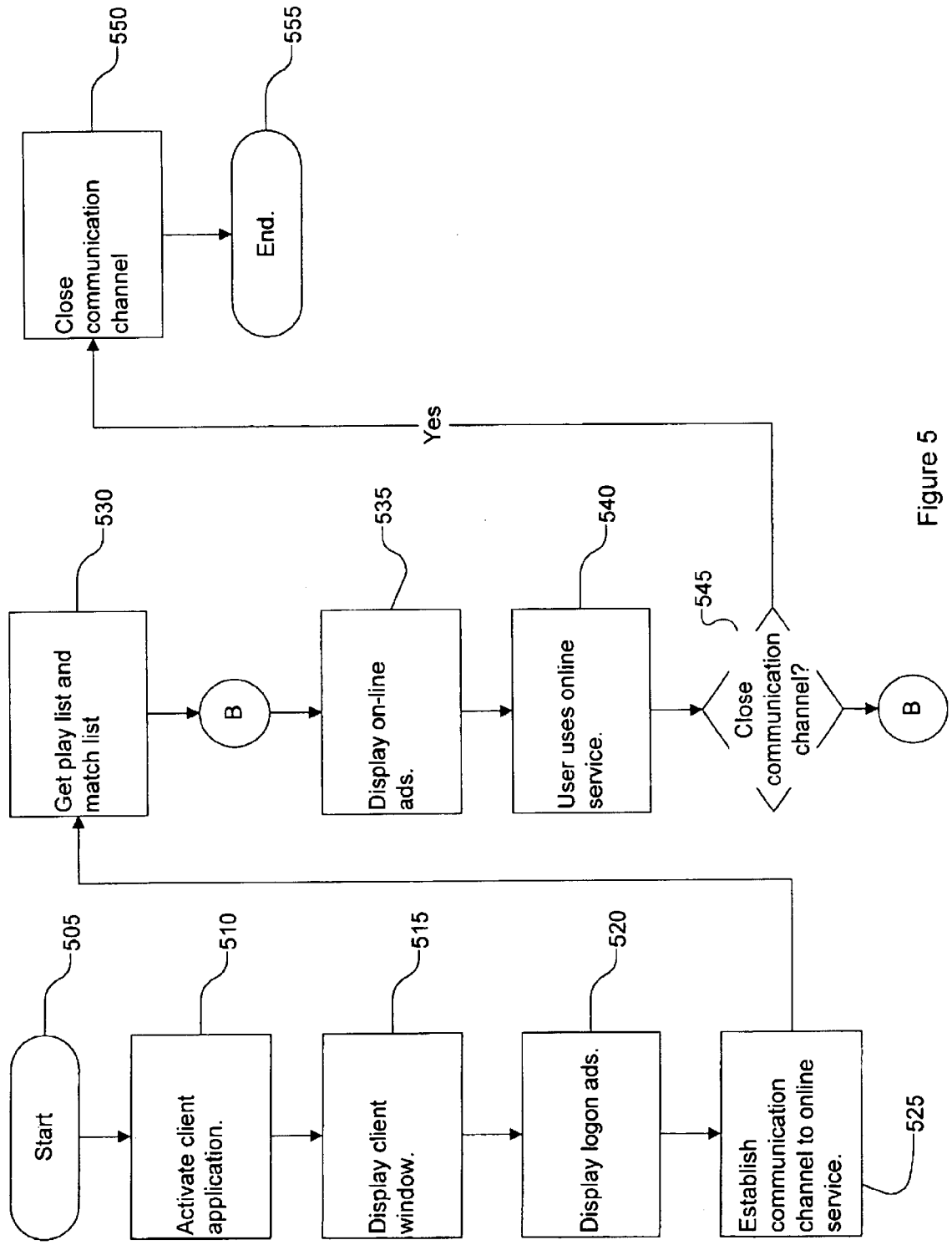
FIG. 5 is a flow chart of a method of displaying advertisements to a user of an online service in accordance with the invention.

Referring now to FIG. 5, there is shown a flow chart of a method of displaying advertisements to a user of an online service in accordance with the invention. This method generally involves the display of advertisements during a logon process and then also during usage of the online service.

After the method begins (step 505), the client application is activated (step 510). The client application 110 may be installed during manufacture of the local device 100, during use of the local device 100 at the instigation of the user, or may occur automatically as a consequence of other processes. Furthermore, the client application 110 may be activated either manually or automatically. Although at least some aspects of the client application 110 should be operable from the local device 100, the client application 100 need not be stored on the local device 100 and can be run from a remote location.

After the client application 110 is activated, the client application 110 may display the client window 200 on the display 101 (step 515). In the next step (step 520), the client application 110 may display one or more advertisements in a window such as in the ad pane 210 of the ad window 200. In the case of dial-up and constant-connection communication channels, the communication channel to the online service might not yet be established or filly open at this point. Thus, the client application 110 cannot obtain the advertisements from the online service. Instead, the client application 110 obtains the advertisements locally. For example, during installation of the client application 110 one or more advertisements are installed on the local device 100 for display outside of a session. Alternatively, the advertisements may be downloaded to the local device at the beginning of a session, during a session, or as part of the termination of a session.

Where it is not desired to display advertisements prior to full establishment of the communication channel, then it is preferred also that the ad pane 210 not be displayed. In such embodiments, it might be desirable to provide a different configuration of the client window 200 than that shown in FIG. 3. For example, the client window 200 might show the status of the connection process.

The client application 110 preferably includes an ad display process which is responsible for displaying sponsored advertisements a window such as in the ad pane 210 of the client window 200. A sponsored advertisement comprises an advertisement that an online service provider displays in the client window 200 on behalf of a sponsor. The ad display process preferably operates in accordance with a play list. The play list comprises one or more ad objects. The ad objects may be, for example, data constructs which each include a resource locator of an advertisement to be displayed, a resource locator to be accessed if the user clicks on (or otherwise selects) the advertisement when displayed in the ad pane 210, and a number of attributes for the display of the advertisement. The display attributes may be one or more of, for example: fade, wash, sweep, fly, blinds, box, checkerboard, crawl, dissolve, peak, spiral, split, stretch, strips, swivel, wipe, zoom. These types of display attributes are well known (though not necessarily with respect to online services) and are therefore not described further herein. The ad objects preferably also specify how long the advertisement should be displayed. Other display attributes are within the scope of the invention. The play list preferably specifies an order in which the advertisements identified in the play list are to be displayed. As an alternative to displaying advertisements in accordance with a play list, the client application is preferably also configured to display advertisements on an individual basis apart from the play list.

As mentioned, each advertisement is associated with an advertisement sponsor. Each ad object preferably includes a sponsor identifier code that is used to identify the sponsor that is associated with the advertisement.

Typically, advertisements in the online industry are associated with a resource locator, and more typically with a URL. As is well known, when a user uses an input device, such as the pointing device 103, to click or otherwise select on an online advertisement in a browser's window such as browser window 300, the browser application loads the resource at the associated URL. This is commonly known as "click-through." In accordance with the invention, if during the display of an advertisement, the user clicks-through on the advertisement, then the client application 110 causes the resource locator associated with the advertisement to be loaded by the browser application 160. If the browser application 160 is not open at the time, then the browser application is first opened and then pointed to the resource locator associated with the advertisement. If the resource locator is not for a web page, the client application 110 or some other software in the local device 100 preferably causes the appropriate application to open so that the resource locator may be opened.

Preferably, the client application 110 displays advertisements from the time that the client application 110 is activated. To accomplish this, the client application 110 preferably is provided with a logon play list for use before the communication channel with the OSP server 130 is open. The client application 110 preferably is also provided with the advertisements referenced in the logon play list. The logon play list is preferably stored on the local device 100 during installation of the client application 110. Subsequently, during each session with the online service, the OSP server 130 provides a new logon play list and the advertisements referenced by the new logon play list to the client application 110 for use by the client application 110 during the next logon. The OSP server 130 can transmit the new logon play list in any of several ways, such as part of establishment of the communication channel to the OSP server 130, during the user's session with the online service, or as part of the closing of the communication channel. The latter is preferred, since it proves the online service provider with the best targeting control.

It should also be appreciated that, where there is a constant-connection communication link, a logon play list can be communicated from the OSP server 130 to the client application 110 at any time. Similarly, in some dial-up environments, such as ISDN, a logon play list can be communicated from the OSP server 130 to the client application 110 at any time using signaling channels or other off-line means.

In the next step (step 525), the client application 110 establishes a communication channel to the online service. With the communication channel established, the client application 110 can now receive a new play list from the OSP server 130 (step 530). This online play list can reference advertisements which are in the data access network 120. In some embodiments, it may be desirable for the OSP server 130 to transmit additional or replacement play lists and/or ad objects to the client application 110.

The client application 110 preferably also receives from the OSP server 130 a match list. The match list comprises one or more match objects. The match objects each comprise an activity identifier and an ad object. The match list guides the client application 110 to display certain advertisements notwithstanding the play list. The activity identifier preferably comprises resource locators and keywords which are used for targeting advertising to the user. The activity identifier may also be an object which altogether describes an online activity in which the user may become involved, such as email or chat.

During the user's session with the online service, the client application 110 preferably monitors the user's interaction with the data access network 120. If the user's interaction with the network matches one of the activity identifiers in the match list, then the ad display process displays the advertisement of the ad object corresponding to the matched activity identifier. Methods for monitoring the online activities of an online user are described in the related application referenced above.

The client application then displays advertisements in accordance with the online play list and the match list (step 535), and this continues while the user uses the online service (step 540).

As an example of the use of the match list, if the user points his browser application 160 to a Web site which the online service provider has previously identified to relate to sale of automobiles, then the online service provider preferably would run an advertisement targeting a potential purchaser of an automobile. The Web site may be identified from its URL, and if the URL is an activity identifier in the match list, the client application 110 can cause the appropriate advertisement to be displayed.

As another example, the user might go to a search engine which is known to the online service provider, and search for information about the sale of automobiles based upon the keywords "automobile sales." The client application 110 preferably checks if the keywords sent to these selected search engines are activity identifiers in the match list. If so, then the client application 110 preferably displays the appropriate advertisement.

At some point, the user's online session will end. To manually close the session, the user can select icon 250 in the client window 200 (FIG. 2). The client application 110 preferably provides the user with the opportunity to confirm the closing of the session (step 545). If the user cancels closure, then the method continues at step 535. If the user confirms closure, then the client application 110 closes the communication channel to the online service (step 550), and the method ends (step 555).

In addition to manual closure, the client application 110 preferably can automatically close the communication channel. In the case of a dial-up connection, the client application 110 preferably can detect inaction by the user. This inaction may be with respect to the data access network 120, or more preferably, with respect to the client application 110. If the user has been inactive for a predetermined period of time, then the client application 110 preferably displays a dialog on the display 101 in which the user is given some period of time to request that the session be continued.

In the case of a constant-connection communication channel, the client application 110 preferably monitors the user's activity with the local device 100 with respect to the online service and thereby detects whether the user is interacting with the online service. Like a screen saver in reverse, the client application 110 detects some period of inactivity and causes the client window 200 to be closed. Alternatively, the client window 200 could remain on the display even when the user's session is terminated, but the client application 110 would allow other windows to be displayed on top of the client window 200. If the user desired to open a session with the online service, the client window 200 would again have to be on top of all other windows, either through automatic or manual means.

As can be seen, this process permits browsing by the user and displaying of advertisements by the client application 100 without interfering with the user's use of the browser application.

In addition to the display of advertisements in the client window 200, the client application 110 preferably monitors the user's click-throughs of advertisements and initiates a process whereby user-related information is passed to an advertisement's sponsor whenever the user clicks-through on the advertisement. The sponsor then utilizes the user-related information to provide the user with an electronic presentation, such as an audio/visual display, that is associated with the advertisement. The electronic presentation preferably comprises at least one web page that is displayed in the browser window 300. The electronic presentation preferably also comprises other visual mediums, such as a window or animated file that opens on the display 101 when the user clicks on an advertisement in the client window 200. One or more audio files are also preferably executed in conjunction with the presentation.

Figure 6:
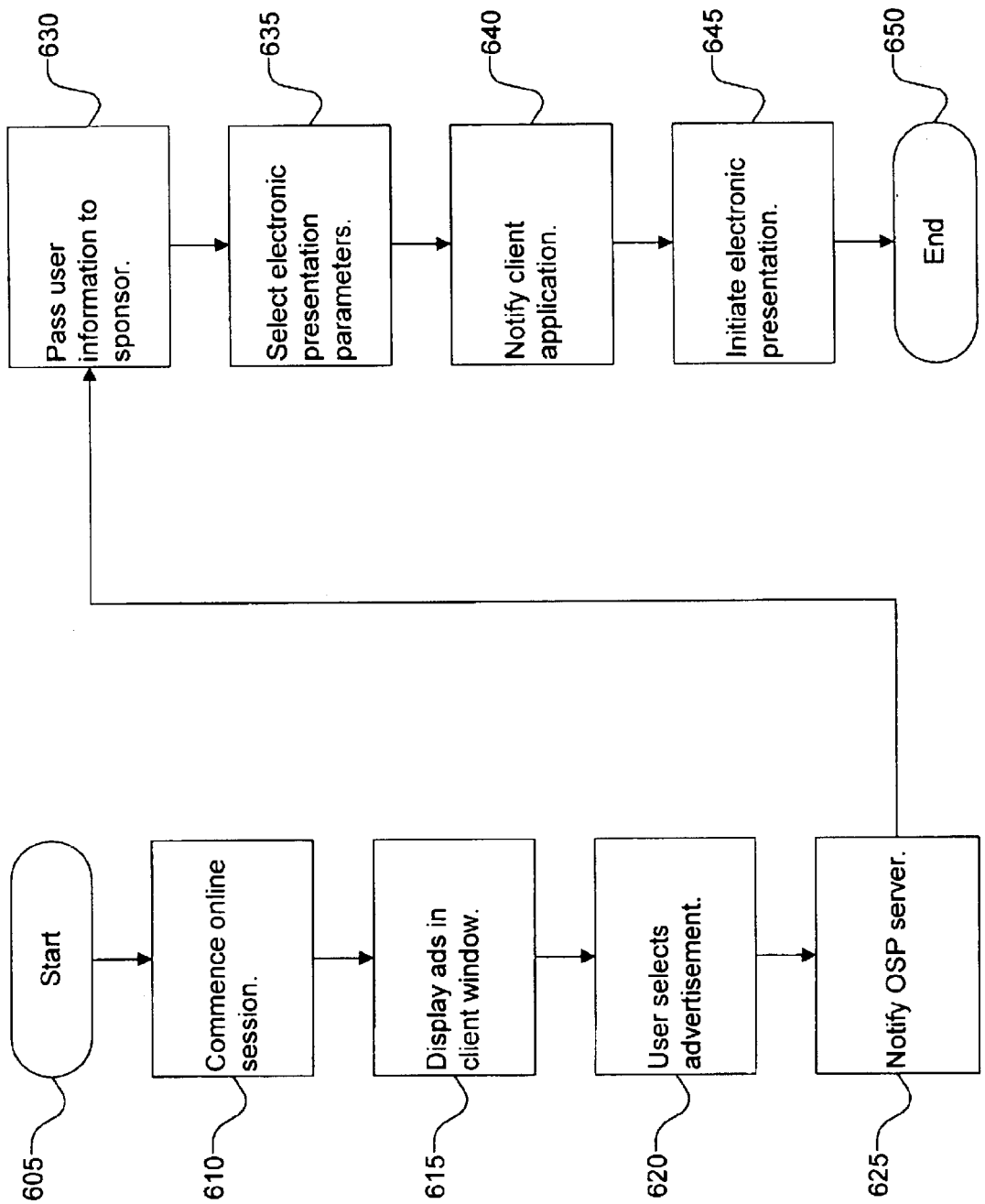
FIG. 6 is a flow chart of a method of using user-related information to provide a user with information related to a clicked-through advertisement.

FIG. 6 shows a flow chart that describes a process whereby a sponsor receives user information and defines in real time the parameters an electronic presentation based upon the user information. The process begins when the user commences an online session (step 605). In the case of a dial-up connection, an online session commences when the client application 110 establishes a communication channel via a PSTN from the local device 100 to the OSP server 130. The online session terminates when the communication channel is closed, or when the client application "hangs up" the connection.

In a constant-connection communication channel, the client application 110 does not actually create or terminate the communication channel, which is always on. Thus, for a constant connection, establishment of a communication channel preferably comprises the client application 110 transmitting a request to the OSP server 130 to authorize the local device 100 to interact with the web server 150. When activated, the client application preferably automatically transmits such a request. The online session commences when the OSP server 130 provides such authorization. The online session terminates when the OSP server 130 removes such authorization, preferably at the request of the user through the client application 110.

In step 615, the client application 110 causes advertisements to be displayed in the client window 200 on the display 101. The client application 110 preferably displays the advertisements in accordance with a play list, as described above with respect to FIG. 5. In another embodiment, the client application 110 displays advertisements apart from the play list. The client application 110 preferably continually displays advertisements in the client window 200 while the communication channel remains open.

At some point during the online session, the user clicks on or otherwise selects a sponsored advertisement in the client window 200 (step 620). The client application 110 then automatically transmits a notification signal to the OSP server 130 that notifies the OSP server 130 that the user clicked on the advertisement (step 625). The notification signal preferably includes an advertisement identification code that the OSP server 130 uses to identify the advertisement on which the user clicked. The notification signal also includes a user identification code that identifies the user that clicked on the advertisement.

Upon receiving the notification signal, the OSP server 130 uses the user identification code to access the user's User Record. The OSP server 130 then forwards at least a portion of the user-related information in the User Record to the advertisement's sponsor (step 630). This may be done by encoding the data in a URL. The sponsor then preferably uses the user-related information to define the attributes of an electronic presentation for the user that is related to the advertisement (step 635).

In one embodiment, passing the user-related information to the sponsor comprises the OSP server 130 invoking a sponsor-defined selection protocol for selecting a customized format or environment for the electronic presentation according to the user information. The selection protocol comprises a set of coded rules that are used to identify one or more resource locators that are accessed in accordance with the presentation. The resource locators preferably specify the electronic location of data related to one or more web pages, an audio file, a visual file such as video or animation file, or any other electronic resource that may be used to present information associated with the advertisement. Preferably, the sponsor defines a unique selection protocol for each advertisement.

In one embodiment, the OSP server 130 searches through the entries in the data fields of the User Record. Based upon the particular entries in the user's User Record, the OSP server identifies the set of resource locators that will be accessed during the electronic presentation. If any of the entries in the User Record match a predefine criteria, then the OSP server 130 automatically identifies a corresponding resource locator. The sponsor preferably defines the selection protocol so that the selected resource locators are particularly targeted toward the user.

For example, if the "age" field in the User Record indicates that the user is a teenager, the selected resource locators preferably identify the location of audio and visual files that are selected to catch a teenager's attention. Another resource locator preferably specifies the location of a web site that is particularly targeted toward teenagers. The OSP server 130 preferably also identifies resource locators that define the location of data related to the attributes of the web site, such as colors, fonts, font sizes, and links that are displayed. Thus, the format of the web site is defined in real time based upon an examination of the user information. This increases the likelihood of the electronic presentation being particularly interesting for the user that clicked on the advertisement to thereby enhance the user's online experience.

After the OSP server 130 identifies the resource locators, the OSP server 130 transmits a signal to the client application 110 instructing the client application 110 to initiate the electronic presentation (step 640). The signal preferably includes one or more codes that identify the resource locators that are accessed in accordance with the presentation.

In step 645, the client application 110 initiates the electronic presentation. The client application 110 preferably causes the local device to access the resources associated with the identified resource locators. For example, the client application 110 causes the browser application 150 to display one or more web pages identified by one of the resource locators. The client application 110 also accesses any other resources that are located on the network 120, such as audio and/or visual files. The resources can be located locally on the local device 100, on the OSP server 130, or anywhere on the network 120. When each of the resources are accessed, the user is provided with a customized electronic presentation related to the clicked-on advertisement.

In addition to passing user-related information to the sponsor in real-time, the client application 110 and OSP server 130 preferably also records and stores user information for the sponsor whenever the user clicks on an advertisement. The sponsor can then use the information to modify or enhance the electronic presentations. The client application 110 preferably creates a record, referred to as a Click-Through record, whenever a user clicks through on an advertisement in the client window 200. The Click-Through record preferably comprises a file that includes information related to the user and to the click-through of the advertisement, as described more fully below.

Figure 7:
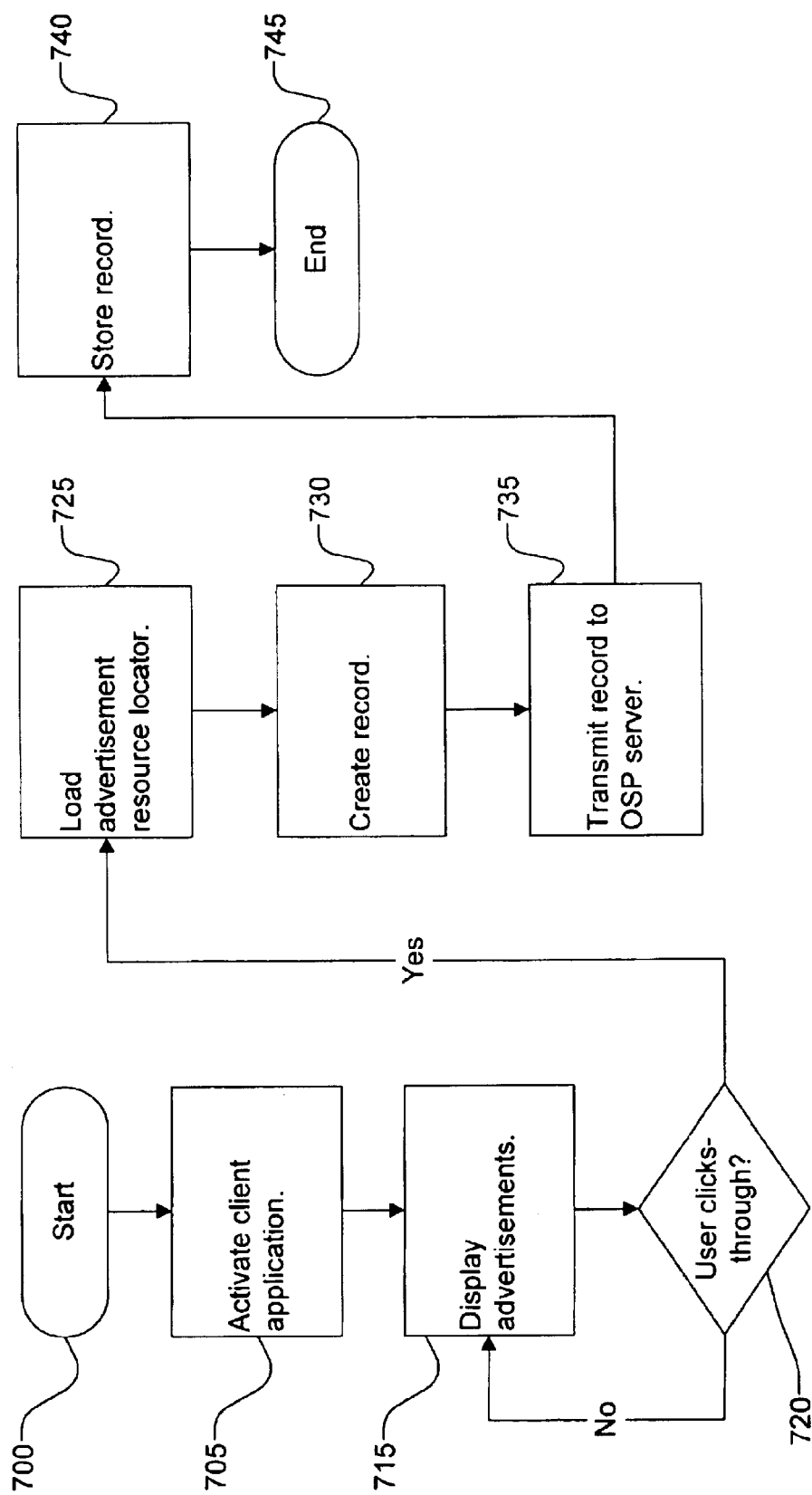
FIG. 7 is a flow chart of a method of recording user-related data when the user clicks-through on an advertisement in accordance with the invention.
Figure 8:
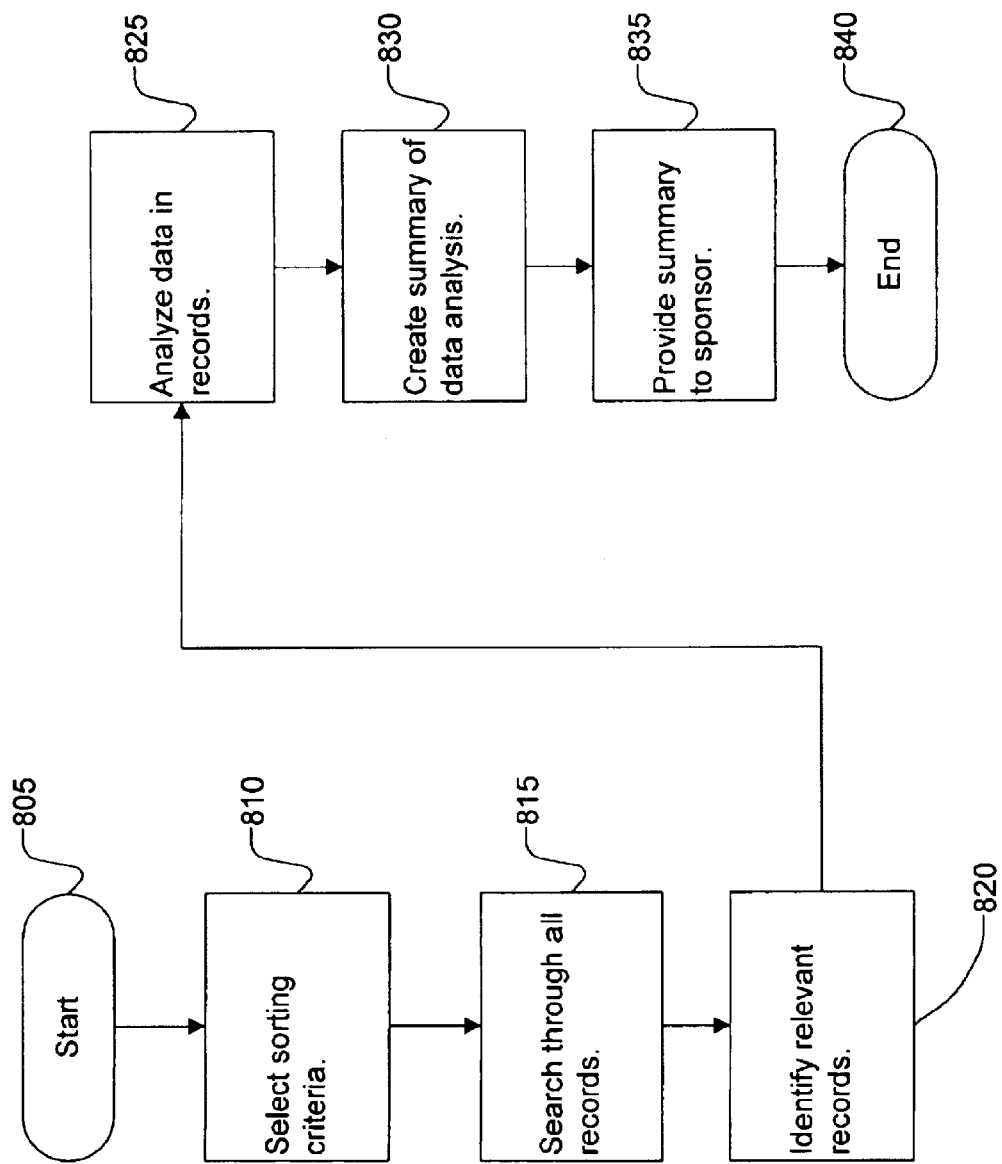
FIG. 8 is a flow chart of a method of storing user-related data for an advertisement sponsor when the user clicks-through on an advertisement in accordance with the invention.

FIG. 7 shows a flow chart that describes a process for recording user data for a sponsor when a user clicks-through on the sponsor's advertisement. The process begins when the user activates the client application 110 (step 705). The client application 110 then commences an online session.

In step 715, the client application 110 displays one or more advertisements in the client window 200 on the display 101 of the local device 110. The advertisements are preferably displayed in accordance with a play list, as described above with respect to FIG. 5. However, the client application 110 may also display advertisements in the client window 200 apart from the play list, or in a second client window 200.

The client application 110 preferably monitors the user's actions with respect to the local device 100 in order to keep track of when the user performs a click-through on a sponsored advertisement in the client window 200 (step 720). A "click-through" of a sponsored advertisement is defined as the user clicking on or otherwise selecting a sponsored advertisement using a computer input device, such as the pointer 103 and/or the keyboard 102. If the user does not click-through on any sponsored advertisement, then the client application continues to display sponsored advertisements in the client window 200 on the display 101 (step 715). If the user does click-through on a sponsored advertisement, then the client application 110 causes one or more resource locator associated with the sponsored advertisement to be accessed (step 725).

After the user clicks through on an advertisement, the client application 110 creates a Click-Through record by first copying the data in the user's User Record into a new file. The click-through record therefore includes all available data associated with the user that performed the click-through on the advertisement. The client application 110 preferably also includes in the Click-Through record various informational aspects with respect to the user's click-through of the sponsored advertisement, including for example, one or more of the following data fields:

1. Time—the time of day at which the user clicked-through on the advertisement;
2. Date—the date on which the user clicked-through on the advertisement;
3. Geographic location of the user when the click-through was performed;
4. Advertisement identifier code that identifies the advertisement on which the user performed the clicked-through;
5. Sponsor identifier code that identifies the sponsor associated with the advertisement.

After the Click-Through record is created, the client application 110 transmits the Click-Through record over the communication channel to the OSP server 130 (step 735). The OSP server 130 then stores the Click-Through record in one or more of the data stores 140 (step 740). Preferably, the OSP server 130 records the time that the Click-Through record is stored in the data stores 140 and writes this information into the Click-Through record. The Click-Through record is preferably stored in a location that is accessible by the sponsor so that the sponsor can view and analyze the data associated with click-throughs on its advertisements. The process is then complete.

In a preferred method, the OSP server 130 periodically sorts the data in the stored Click-Through records and assembles the data into a format that is usable and accessible by the sponsor or sponsors associated with the stored Click-Through records. FIG. 7 shows a flow chart that describes a process in which the OSP server 130 sorts through and organizes the advertisement click-through data. The OSP server 130 preferably automatically initiates the process on a periodic basis for each advertisement, such as on a nightly basis. Preferably, advertisement sponsors may also manually initiate the process, such as through an Internet web site. Once the process is initiated, the OSP server 130 sorts through and assembles the click-through data based upon one or more sorting parameters. For example, the OSP server 130 may sort through and assemble all Click-Through data associated with a particular advertisement or a particular sponsor, or all Click-Through records in which the click-through occurred within a give time or date span.

In step 805, the OSP server 130 or the sponsor selects one or more criteria for sorting through the Click-Through records. The available sorting criteria correspond to the data fields in the Click-Through records. The OSP server 130 preferably uses the advertisement identifier code data field as a default criterion. That is, in a default mode the OSP server 130 preferably sorts through and identifies all Click-Through records associated with a given advertisement identifier. Preferably, an advertisement sponsor can manually select alternate sorting criterion corresponding to any of the data fields in the click-through records. For example, the sponsor may specify a given sponsor identifier code as the sorting criterion so that the OSP server 130 sorts through and identifies all click-through data associated with a given sponsor. The OSP server 130 preferably utilizes security measures to ensure that a given sponsor has privileges to only sort through data associated with that sponsor's advertisements.

The OSP server 130 next searches all Click-Through records in the data store 140 (step 810), particularly with respect to the data fields corresponding to the selected sorting criteria. The OSP server 130 then identifies all Click-Through records where the entry in the relevant data field matches the sorting criteria (step 815). For example, in the default mode, the OSP server 130 identifies all Click-Through records where the advertisement identifier code entry matches the advertisement identifier code currently being used as a sorting criteria. In this manner, the OSP server 130 identifies all Click-Through records associated with a given advertisement (step 820). Preferably, in a default mode, the OSP server 130 limits the search to click-throughs that occurred within the last thirty days of the search in order to minimize loads on the OSP server 130. The time window of the search maybe expanded if desired.

After the OSP server 130 identifies the Click-Through records that match the relevant selected criteria, the OSP server 130 then analyzes the data in the identified Click-Through records (step 825). This step preferably comprises the OSP server 130 performing a statistical analysis of the data. In a default mode, the OSP server 130 preferably: (1) calculates the quantity of click-throughs that occurred on the advertisement within a given time period (preferably, within the last thirty days); and (2) for each demographic category, calculates the quantity of users associated with a given demographic category entry that have clicked on the advertisement within the given time period. For example, the OSP server 130 calculates the number of users located within the same geographic region that clicked through on the given advertisement in the last thirty days. The OSP server 130 may readily perform these calculations using the data contained in the identified Click-Through records.

The OSP server 130 preferably also uses well-known statistical analysis algorithms to identify any trends in click-through frequency for the advertisement within a given time period for any of the demographic categories. The OSP server 130 may perform various other types of statistical analyses on the data in order to provide sponsor with a thorough statistical picture of the performance of an advertisement with respect to the sorting criteria. The statistical analyses are preferably aimed at providing a picture of the type of users that have clicked through on the given advertisement within a given time period.

In step 830, the OSP server 130 creates a Summary Record comprising a file that contains the results of the aforementioned data identification and data analysis. In one embodiment, the Summary Record does not include any statistical analysis, but merely comprises a file that includes a collection of each of the relevant Click-Through records that were identified in step 825. In such a case, the sponsor is responsible for analyzing the data and performing any statistical analysis of the data in the Click-Through records. In another embodiment, the summary record includes the results of the statistical analysis performed in step 825, including objects associated with text and graphical displays, such as tables and graphs, to assist the sponsor in analyzing the data.

The Summary Record is then provided to the sponsor for review (step 835). In one embodiment, the OSP server causes a printer to print the information contained in the summary record. The OSP server 130 automatically forwards the resulting print-out hard copy to the relevant sponsor. In another embodiment, the OSP server 130 provides the Summary Record in electronic format for display to the sponsor through an electronic medium, such as through an Internet web page or via email. The OSP server 130 may also write the Summary Record to a data store 140 and thereafter provide the sponsor with access privileges to the Summary Record. The aforementioned process preferably provides the sponsor with a statistical picture related to the users that have performed click-through on any of the sponsor's advertisements.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A method of providing an advertisement-related electronic presentation to a user of an online service, and tracking user response, the method comprising:

a client application on a local device obtaining personal profile information from the user;

the client application causing an advertisement to be displayed on the local device;

the client application monitoring if the user performs a click-through on the advertisement, wherein the client application is not a browser application;

the user performing a click-through on the advertisement;

the client application creating and locally storing a click-through record, the click-through record including the time the user performed the click-through, the date the user performed the click through, geographic location data of the local device, an advertisement identifier code associated with the advertisement, a user identifier code associated with the user, and a sponsor identifier code associated with the sponsor;

the client application transmitting a notification signal to the online server notifying the online server that the user clicked on the advertisement, wherein the notification signal includes the advertisement identifier code and the use identifier code;

the client application receiving one or more resource locators based on a selection protocol associated with the advertisement, the personal profile information, and the advertisement identifier code;

the client application causing the local device to access one or more resources associated with the one or more source locators.

2. The method of providing an advertisement-related electronic presentation to a user of an online service, and tracking user response of claim 1 wherein the advertisement is displayed in a client window displayed by the client application.

3. The method of providing an advertisement-related electronic presentation to a user of an online service, and tracking user response of claim 1, wherein at least one of the resource locators is a uniform resource locator specifying the address of an Internet web page.

4. A method of providing a sponsor access to click-through data related to an advertisement that is displayed to a user of an online service administered by an online service provider, the user using a client application on a local device to access an online server associated with the online service, the local device include an input device and an output device, wherein the online service display the advertisement to the user on behalf of a sponsor, the method comprising:

the client application causing the advertisement to be displayed on the output device;

the client application monitoring if the user performs a click-through on the advertisement, wherein the client application is not a browser application;

the user performing a click-through on the advertisement;

the client application creating and locally storing a click-through record, the click-through record including the time the user performed the click-through, the date the user performed the click through, geographic location data of the local device, an advertisement identifier code associated with the advertisement, a user identifier code associated with the user, and a sponsor identifier code associated with the sponsor;

the client application transmitting the click-through record to the online server via a communication channel from the local device to the online server;

the client application receiving one or more resource locators based on a selection protocol associated with the advertisement, personal profile information associated with the user, and the advertisement identifier code;

the online server storing the click-through record in a format that is accessible by the sponsor.

5. The method of providing a sponsor access to click-through data related to an advertisement of claim 4, wherein the advertisement is displayed in a client window displayed by the client application.

6. The method of providing a sponsor access to click-through data related to an advertisement of claim 4, wherein the communication channel from the local device to the online server comprises a public switched telephone connection.

7. The method of providing a sponsor access to click-through data related to an advertisement of claim 4, wherein the communication channel from the local device to the online server comprises a digital subscriber line.

8. The method of providing a sponsor access to click-through data related to advertisement of claim 4, wherein the communication channel from the local device to the online server includes a wireless communications link.

9. The method of providing a sponsor access to click-through data related to an advertisement of claim 4, wherein the data set includes information related to the user comprises at least one of the user's: name, street address, city, state, education level, income level, gender, age, and marriage status.

10. The method of providing a sponsor access to click-through data related to an advertisement of claim 4, wherein the online server storing the data set in a format that is accessible by the sponsor comprises the online server electronically storing the data set in a data store, wherein the sponsor has access-privileges to the data store.

11. The method of providing a sponsor access to click-through data related to an advertisement of claim 4, wherein the online server storing the data set in a format that is accessible by the sponsor comprises the online server causing a printer to print the information on a print-out and thereafter providing the print-out to the sponsor.

12. A method of assembling data related to a user's interaction with an advertisements, the user accessing an online service via a local device and a client application, the local device including an input device and an output device, the method comprising:

the user providing the client application with data descriptive of the user, wherein the data includes the user's name, address, occupation, marriage status, age, gender, state, country, zip code, income, education level, hobbies, family size, sports interest, and musical interests;

the client application locally storing the user-descriptive data in a first data set;

the client application causing an advertisement to be displayed on the output device;

the user using the input device to perform a click-through on the advertisement;

the client application creating and locally storing a click-through record, the click-through record including the time the user performed the click-through, the date the user performed the click through, geographic location data of the local device, an advertisement identifier code associated with the advertisement, the user-descriptive data, and a sponsor identifier code associated with the sponsor;

the client application transmitting the click-through record to an online server associated with the online service via a communication channel linking the local device to the online server.

13. The method of assembling data related of claim 12, wherein the advertisement is displayed in a client window displayed by the client application.

14. The method of assembling data related of claim 12, further comprising the online service provider provides the sponsor with the information contained within the click-through record.

15. The method of assembling data related of claim 13, wherein the online service provider provides the sponsor with the information contained within the click-through record via an electronic medium.

16. The method of assembling data related of claim 12, additionally comprising the client application establishing the communication channel from the local device to the online server via a public switched telephone network.

17. The method of assembling data related of claim 12, wherein the communication channel linking the local device to the online server comprise a wireless connection.

* * * * *

UNITED STATES PATENT AND TRADEMARK OFFICE
CERTIFICATE OF CORRECTION

PATENT NO. : 6,847,992 B1
DATED : January 25, 2005
INVENTOR(S) : Haitsuka et al.

It is certified that error appears in the above-identified patent and that said Letters Patent is hereby corrected as shown below:

Column 1,
Line 45, replace "any one" with -- anyone --.

Column 2,
Line 23, replace "computer networks, many" with -- computer networks, may --.

Column 20,
Line 21, replace "with an advertisements" with -- with an advertisement --.

Signed and Sealed this

Twelfth Day of July, 2005

JON W. DUDAS
*Director of the United States Patent and Trademark Office*

UNITED STATES PATENT AND TRADEMARK OFFICE
CERTIFICATE OF CORRECTION

PATENT NO.    : 6,847,992 B1
DATED         : January 25, 2005
INVENTOR(S)   : Haitsuka et al.

It is certified that error appears in the above-identified patent and that said Letters Patent is hereby corrected as shown below:

Column 3,
Line 53, replace "chan ge" with -- change --.

Column 10,
Line 48, replace "client application 1110" with -- client application 110 --.

Column 11,
Line 9, replace "client application 100" with -- client application 110 --.
Line 19, replace "or filly open" with -- or fully open --.

Column 15,
Line 23, replace "predefine" with -- predefined --

Column 16,
Line 32, replace "more resource locator" with -- more resource locators --.
Line 51, replace "clicked-through" with -- click-through --

Column 19,
Line 5, replace "use identifier code" with -- user indentifier code --.
Line 12, replace "source locators" with -- resource locators --.
Line 27, replace "local device include" with -- local device including --.
Line 67, replace "related to advertisement" with -- related to an advertisement --.

UNITED STATES PATENT AND TRADEMARK OFFICE
CERTIFICATE OF CORRECTION

PATENT NO. : 6,847,992 B1
DATED : January 25, 2005
INVENTOR(S) : Haitsuka et al.

It is certified that error appears in the above-identified patent and that said Letters Patent is hereby corrected as shown below:

Column 20,
Line 28, replace "income, education level" with -- income and education level --.
Line 29, replace "sports interest" with -- sports interests --.
Line 65, replace "online server comprise" with -- online server conprises --.

Signed and Sealed this

Ninth Day of August, 2005

JON W. DUDAS
*Director of the United States Patent and Trademark Office*